Sept. 21, 1965  F. W. CALDWELL  3,207,226
ROTOR DRIVING MECHANISM
Filed Sept. 10, 1964  3 Sheets-Sheet 1

INVENTOR
FRANK W. CALDWELL
BY Harris G. Luther
ATTORNEY

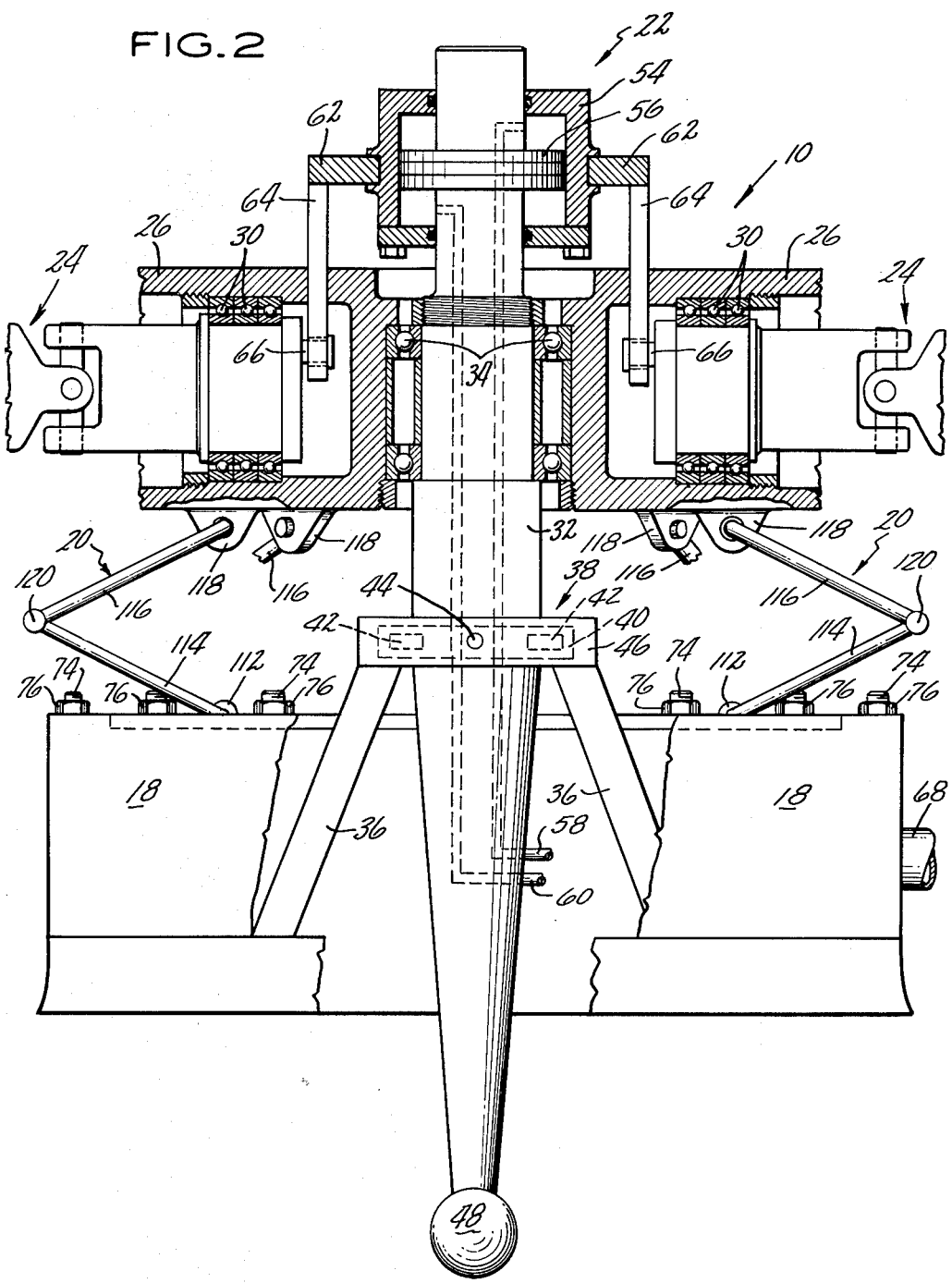

Sept. 21, 1965     F. W. CALDWELL     3,207,226
ROTOR DRIVING MECHANISM
Filed Sept. 10, 1964     3 Sheets-Sheet 3

INVENTOR
FRANK W. CALDWELL
BY *Harris G. Luther*
ATTORNEY

United States Patent Office 3,207,226
Patented Sept. 21, 1965

3,207,226
ROTOR DRIVING MECHANISM
Frank W. Caldwell, 54 Pilgrim Road,
West Hartford, Conn.
Filed Sept. 10, 1964, Ser. No. 395,488
6 Claims. (Cl. 170—135.75)

This invention relates to driving mechanism and particularly to reduction gear driving mechanism for a universally mounted helicopter rotor.

An object of this invention is an improved compact reduction gear drive.

A further object is a mounting, including driving mechanism, for a universally mounted rotor in which the inclination of the rotor and its axis are adjustable as a unit, relative to the driving mechanism.

Other and additional objects of the invention will be apparent from the following specification and the attached drawings in which:

FIG. 2 is a diagrammatic side view partially in section, of the rotor mounting and drive mechanism;

Figure 1:
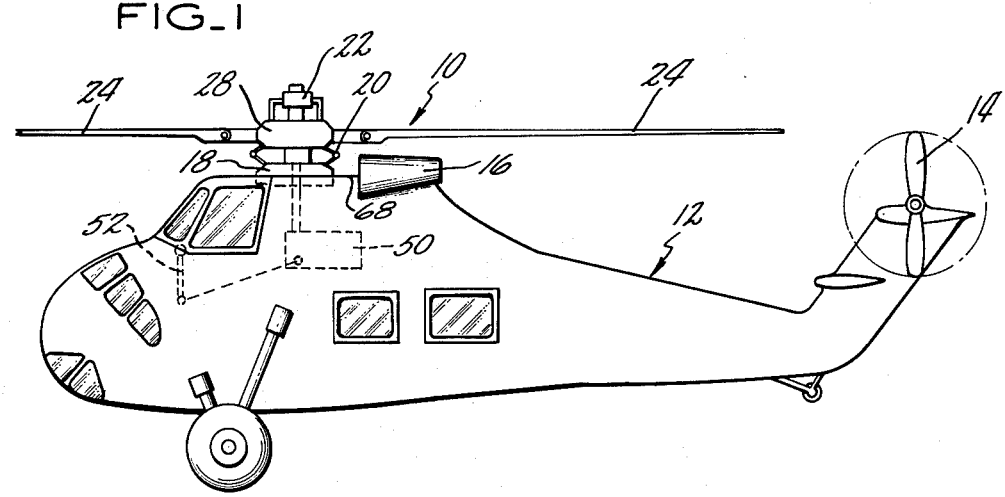
FIG. 1 is side view, partially schematic, of a helicopter incorporating the invention.
Figure 3:
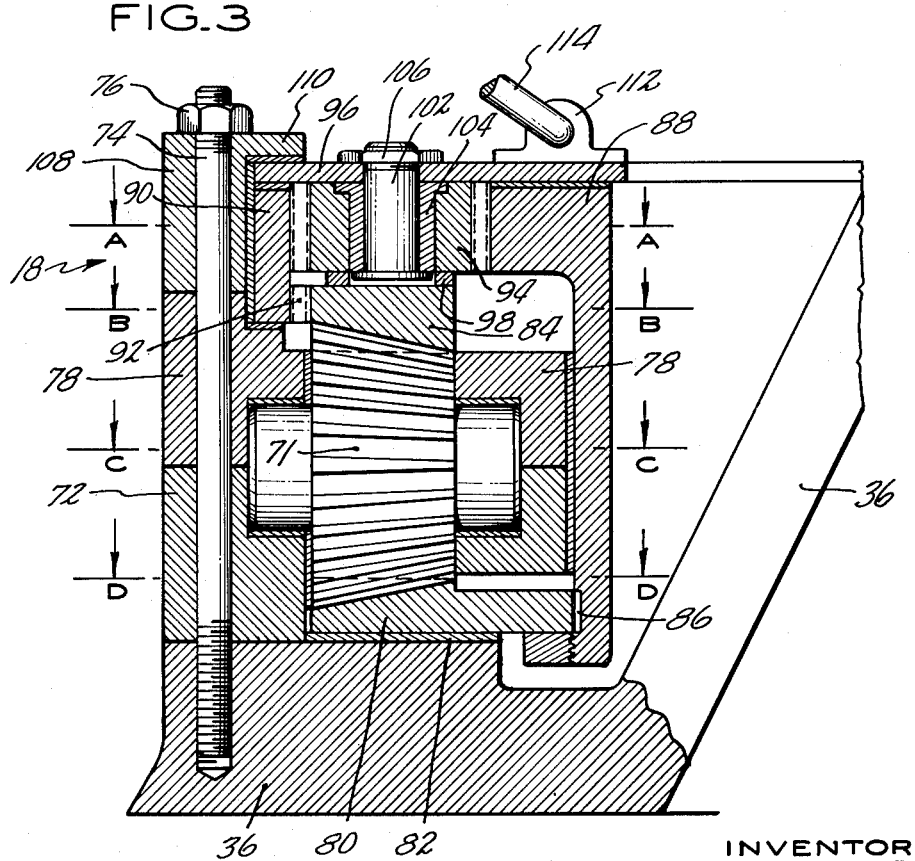
FIG. 3 is an enlarged cross section of a portion of the reduction gear and its support.
Figure 4:
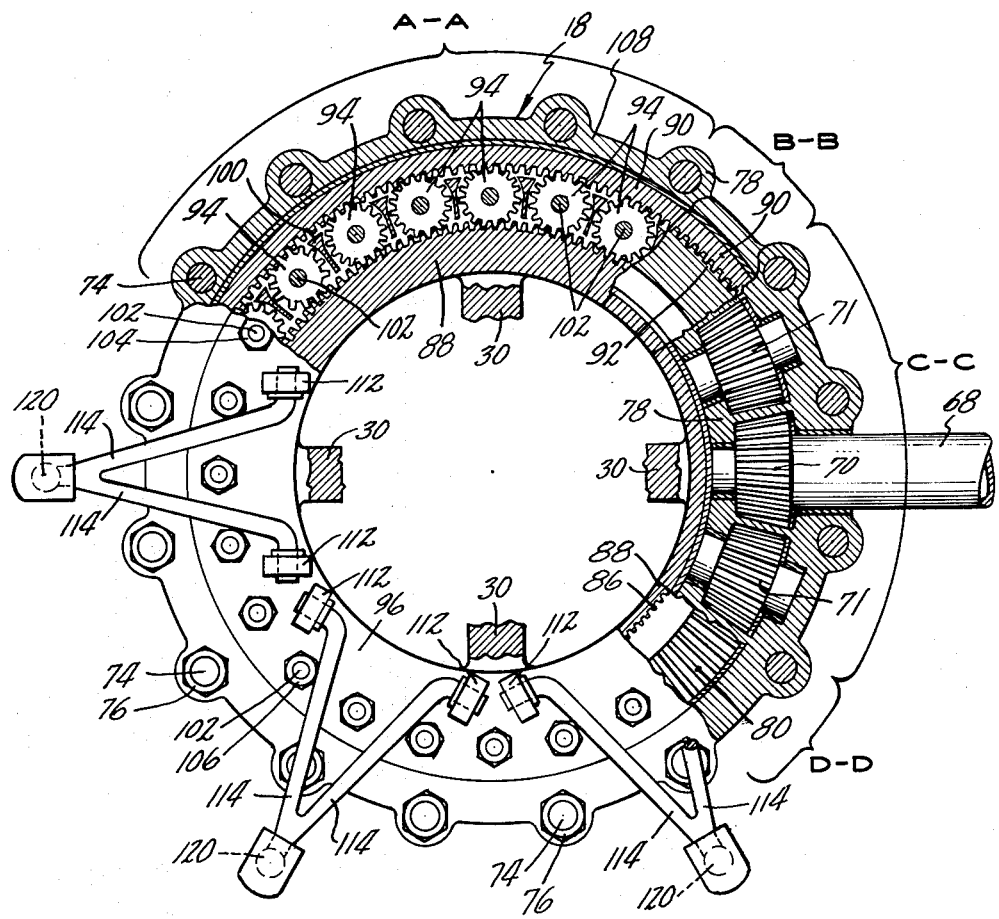
FIG. 4 is a plan view with portion broken away and portions in section of the reduction gear and a portion of the universal connection to the rotor.

In using a turbine for driving a helicopter rotor, mechanism must be provided in the drive between the turbine and the rotor for reducing the shaft speed from say 15,000 r.p.m. of the turbine to say 250 r.p.m. of the rotor. In addition in a rotor having a power driven fixed or rigid hub mounted for universal inclination provision must also be made for transferring the reduced speed to the universally inclined rotor hub. Applicant's invention provides improved compact structure for performing both functions in a novel and efficient manner.

In the device disclosed in the drawings which illustrate the now preferred embodiment, the rotor, indicated generally at 10, is supported for rotation on a helicopter shown generally at 12 having any desired torque reaction mechanism such as a tail rotor 14. The rotor may be driven by any suitable means such as a turbine 16 feeding into a gear reduction mechanism 18 connected with, and driving, the hub 28 and the rotor 10 through a suitable universal joint 20. Any well known pitch changing mechanism indicated generally as 22 may be utilized to provide pitch control for the rotor blades 24.

The rotor 10 comprises blades 24, of which there may be any desired number although only two are shown in the drawings, mounted for pitch changing movement generally about the longitudinal axis of the blades, in blade sockets 26 carried by and forming part of a hub 28. The blade sockets are generally fixed or rigid with respect to the hub and may form an integral unit with the hub so that the blade axes at the blade shank are at all times fixed with respect to the hub although the blades may change pitch by rotation about the blade axis. The blades and their sockets are hinged for either flapping or drag movement with respect to the supporting hub and blade shank. A suitable universal joint connection may be provided between the blade shanks and the main portion of the blades so that centrifugal compensation for the lift and drag forces may take place in the usual way. The blade shanks may be retained in the blade sockets 26 by any of the well-known blade supporting means shown schematically as bearings 30. The hub 28 is mounted for rotation about one end of portion of a vertical shaft 32 by any suitable means such as bearings 34 and held against longitudinal movement relative to the shaft by those bearings. The shaft 32 extends through and is held against rotation in a hollow or open center mast 36 secured in any suitable manner to the frame or structural members of the helicopter 12, by means of a universal joint indicated generally at 38. This joint may be of any suitable type and is shown for purposes of illustration as the well-known gimbal in which the ring 40 supports the shaft on one set of pivots 42 and is in turn itself supported upon another set of pivots 44, at right angles to the pivots 42, in a ring member 46 rigidly secured to and forming part of the mast 36. The shaft 32 is thus held against rotation and against longitudinal axial movement but is free for rotary transverse movement about the pivots 42 and 44. The shaft 32 thus may be universally inclined from its generally vertical position within the mast 36 as shown in FIGS. 1 and 2. The hub 28 being secured to the shaft 32 by the bearings 34 will also partake in this universal inclination, inclining from the generally horizontal plane or a plane of rotation shown in FIGS. 1 and 2 as the shaft 32 is inclined.

Any suitable mechanism such as well-known servomechanisms may be connected to the shaft end 48 shown as located below the reduction gear for imparting transverse motion to the shaft end 48 in two directions at right angles to each other preferably fore and aft and transverse of the helicopter for imparting the universal tilting or inclination to the shaft 32 to the hub 28 and the rotor 10. The servo-mechanism 50 which is preferably hydraulic may be controlled in any suitable well known manner such as by the stick control 52 which may be manually operated by the pilot.

The pitch of the rotor blades may be controlled by any of several well known pitch control mechanisms such for example as that shown in Anderson Patent No. 2,653,668 issued September 29, 1953, for "Hub Mounted Control" but which for the sake of simplicity is shown in the drawings as a cylinder 54 slideably mounted on the outer end of shaft 32 and surrounding a piston 56 fixed on the shaft 32. Suitable fluid such as oil under pressure may be introduced selectively into lines 58 and 60 to move the cylinder 54 in one direction or the other. A collar 62 is rotatably mounted on the cylinder 54 and is held against longitudinal movement thereon. Any suitable means such as arms 64 secured to the ring 62 may cause the ring 62 to rotate with respect to the shaft 32 and impart longitudinal movement of the ring 62 to offset pins 66 in the base of the blades 24 to thereby turn the blades on their pitch changing axes. The arms 64 may incorporate any suitable mechanisms such as a yoke, not shown, to assist in transferring the reciprocating motion of the arm 64 into the rotary motion of the blade pitch changing movement.

The rotor 10 including the hub 28 may be rotated about the axis of the shaft 32 by any suitable engine such as a tubine 16 driving a shaft 68 which in turn drives a gear 70 in the gear reduction system 18 which has an output member connected to the hub 28 of the rotor 10. The gear box or gear reduction 18 comprising a casing or base 72 secured, as by a stud 74 and a nut 76, to the mast 36 and the frame of the helicopter. A plurality of preferably metal gears 71 including the driving gear 70 are rotatably mounted in the base 72 and secured in position by means of a mating cap 78 secured to the base 72 by the stud 74 and the nut 76 and if desired by additional means, not shown. A lower ring gear 80 is supported on a bearing member 82 supported by the mast 36 or other means fixed with respect to the base 72. An upper ring gear 84 is positioned on the opposite side of the beveled gears 70, 71 so that rotation of the driving gear 70 will cause rotation of the beveled gears 71 and rotation of the lower ring gear 80 and upper ring gear 84 in opposite direction and at the same speed. It should be understood that although driving the ring gears 80 and 84 at the same speed in opposite directions is the now preferred embodiment, if desired suitable structure may be provided for driving the ring gears in opposite directions at different speeds such as by making the beveled gears 70, 71 compound gears and the annular ring gears 80 and 84 of different diameter.

Secured to ring gear 80 by means of splines 86 is an annular sun gear 88 for rotation with the beveled annular ring gear 80. An internal annular ring gear 90 is splined at 92 to the upper beveled ring gear 84 and is concentric with ring gear 84 and driven thereby. A plurality of pinions 94 mesh with the sun gear 88 and the ring gear 90 and form therewith a planetary gear system. The pinions 94 are mounted in a cage comprising an outer plate 96, which may be the output member of the reduction gear, connected with an inner plate 98 by a web 100, and rotate about stub shafts 102 connecting the plates 96 and 98 and clamping a bearing sleeve 104 therebetween by means of the nut 106. A cap member 108 in the form of a ring having an overhanging flanges 110 overlapping the plate 96 together with members 72 and 78 forms a gear casing secured to, and surrounding the mast 36 by the stud 74 and nut 76 and serves to force the members 72 and 78 into tightly assembled position against the base of the mast 30 and to secure the entire gear assembly and casing in assembled relation. Secured to the upper surface of the ring plate 96 as by welding or by bolts, not shown, are a series of pillow blocks 112 or other suitable means pivotally supporting outwardly extending arms 114. Similar arms 116 are mounted in suitable bearing means 118 secured to the hub 28 and extending outwardly therefrom. Arm 114 and 116 are joined at their outer ends in a ball and socket joint 120. These arms 114, 116 and their connections form a universal joint connecting the fixed reduction gear unit 18 with the tiltable hub 28 and serve to transmit the driving torque from the reduction unit 18 to the hub 28 and rotate the hub about the shaft 32. The arms 114 are arranged around the entire periphery of the reduction gear 18 and the centers of the ball and socket joints 120 all lie in a single plane passing through the intersection of the axes of the pivots 42 and 44 of the gimbal 38. The ring gears 80, 84 and 90 and the sun gear 88 are all concentric about an axis passing through the intersection of the pivots 42 and 44 and with the shaft 32, which extends through the open center of the reduction gear, in an untilted position, the axis of the several gears coincides with the axis of the shaft 32. In such a position a line connecting the center of the pivots 112 with the center of the pivots 118 will be parallel to the axis of the shaft 32. While a particular type of universal joint transmitting uniform motion from the gear box 18 to the hub 28 has been shown it will be understood that any other suitable type of universal joint may be utilized, preferably one which will transmit uniform motion.

It will be appreciated that by the above described structure I have provided mechanism by which the plane of rotation of the rotor may be manually tilted in any direction with respect to the fuselage of the helicopter and by which the rotor may be uniformly driven throughout its entire tilting range through a compact gear reduction unit providing a very great speed reduction with means for distributing any torque load over a large number of teeth and for reducing the forces in the torque transmission by placing the transmission members on a large diameter.

It is to be understood that the invention is not limited to the specific embodiment herein illustrated and described, but may be used in other ways without departing from its spirit and that various changes can be made which would come within the scope of the invention which is limited only by the appended claims.

I claim:

1. In combination, a fixed support, an elongated vertical shaft, a pivotal connection, including a universal joint connecting an intermediate portion of said shaft with said support for transverse pivotal movement and holding said shaft against axial movement and rotation about its axial, a rotor rotatably supported on said shaft above said joint, drive means including a reduction gear having a portion fixed with respect to said support and having an open center and a rotatable annular output member surrounding said shaft and support and spaced below said joint, universal joint means concentric and axially aligned with said first mentioned universal joint, located between and connecting said rotor with the upper portion of said output member and manually controlled means connected with said shaft below said pivotal connection and said reduction gear and moving said shaft independent of aerodynamic forces about said pivotal connection to tip the plane of rotation of said rotor.

2. A combination as claimed in claim 1 in which said second mentioned universal joint is located entirely below the plane of rotation of said rotor and comprises a plurality of outwardly directed arms pivoted on the upper portion of said output member for movement in a plane containing the axis of rotation of said member, a plurality of corresponding outwardly extending arms pivotally mounted on the lower portion of said rotor and pivoted for movement in a plane containing the axis of rotation of said rotor and a universal joint connecting the outboard ends of corresponding arms.

3. In combination a rotor rotatably mounted on a shaft by bearing means connecting said shaft and rotor and limiting movement of said rotor to rotation in a plane normal to said shaft, a fixed hollow mast, a universal joint pivotally supporting said shaft on said mast for transverse pivotal movement on said mast, a reduction gear comprising a casing surrounding and fixed on said mast, driving means supported in said casing and driving an internal annular gear and an external annular concentric gear in opposite directions, pinions supported in a cage and connecting said internal and external gears and driving said cage, a universal joint concentric with said first mentioned universal joint connecting said cage with said rotor for driving said rotor, said shaft extending from said first mentioned universal joint through said hollow mast and said annular gears, and means adjacent the end of the portion of said shaft extending through said gears imparting transverse pivotal movement to said shaft for tilting said rotor.

4. In combination a hub rotatably mounted on the upper portion of a vertically directed shaft, bearing means connecting said hub and shaft and limiting movement of said hub to rotation in a plane normal to said shaft, a mast adapted to be secured to a fuselage, a universal joint connecting said mast with a portion of said shaft intermediate the ends of said shaft and below said hub for universal transverse pivotal movement of said shaft and providing universal inclination of said hub and shaft, a reduction gear surrounding said shaft and mast and adjacent to but below said universal joint and having concentric annular sun and ring fears arranged on a vertical axis and a horizontally directed driving shaft driving said sun and ring gears in opposite directions, pinion gears meshing with said sun and ring gears and driven thereby, a pinion cage adjacent the upper side of said reduction gear and spaced substantially the same distance below said universal joint as said hub is above said joint, supporting said pinions and rotatable with said pinions about said vertical axis, a universal joint concentric with said first mentioned universal joint, extending between and connecting the upper side of said pinion cage with the lower side of said hub for driving said hub and accommodating the universal inclination of said hub.

5. A rotor head for a helicopter comprising a fixed hollow mast adapted to be supported by the helicopter fuselage, a shaft, universal joint means intermediate the ends of said shaft connecting said shaft and said mast and holding said shaft against longitudinal movement and axial rotation and supporting said shaft for universal inclination, a rotor including a hub rotatably supported on an adjacent one end of said shaft and axially spaced from said universal joint means for rotation about the axis of said shaft and universally inclinable with said shaft, an annular reduction gear having a hollow central portion and surrounding said mast and said shaft and having a portion fixed with respect to said mast and having a rotatable output member spaced from said universal joint means substantially the same distance as and on the opposite side of said universal joint means from said hub, universal joint means concentric with said first mentioned universal joint means connecting said output member with the adjacent side of said hub and surrounding said shaft and mast and providing driving mechanism having a comparatively large diameter and accordingly subjected to comparatively low torque force for driving said hub, said shaft extending through the hollow center portion of said reduction gear and mast, and means independent of said rotor for applying force to the portion of said shaft extending through said reduction gear for tipping said rotor.

6. A rotor head comprising a fixed hollow mast, adapted to be supported by a fuselage, a shaft, a universal joint intermediate the ends of said shaft connecting said shaft and mast and holding said shaft against longitudinal movement and axially rotation and supporting said shaft for universal inclination, a rotor hub rotatably supported on and adjacent one end of said shaft, bearing means holding said hub against axial, tilting, and transverse movement with respect to said shaft and rotatably connecting said hub with said shaft for rotation about the axis of said shaft and universally inclinable with said shaft, a reduction gear having a fixed annular casing and support fixed with respect to said mast and comprising an annular sun and a ring gear and planet gears therebetween substantially concentric with and surrounding said mast and shaft, means for driving said sun and ring gears in opposite directions around said mast, a planet gear cage supporting said planet gears, universal joint means having a center common with said universal joint comprising arms pivoted on and extending outwardly from said planet cage axis, arms pivoted on said hub and extending outwardly from said rotor hub axis, and a universal joint connecting the outer ends of each pair of said arms for driving said rotor hub, said shaft extending axially through said hollow mast, said annular sun gear and reduction gear and supporting said rotor adjacent one side of said reduction gear, means on the other side of said reduction gear and adjacent the other end of said shaft for moving said shaft transversely about its universal joint within said hollow mast and reduction gear for bodily tilting said rotor.

References Cited by the Examiner

UNITED STATES PATENTS

| | | | |
|---|---|---|---|
| 2,264,943 | 12/41 | Larsen | 170—160.27 |
| 2,644,533 | 7/53 | Maillard et al. | 170—135.4 X |
| 2,702,601 | 2/55 | Nagler | 170—160.27 X |
| 2,861,641 | 11/58 | Bensen | 170—160.27 |
| 2,884,808 | 5/59 | Mueller | 74—705 |
| 2,886,261 | 5/59 | Robert et al. | 170—160.27 X |
| 2,988,155 | 6/61 | Armstrong | 170—160.27 X |

FOREIGN PATENTS 836,603   6/60   Great Britain.

MARK NEWMAN, *Primary Examiner.*

JULIUS E. WEST, *Examiner.*